Sept. 18, 1956     P. E. OHMART     2,763,789
CONTROL DEVICE

Filed March 3, 1953     2 Sheets—Sheet 1

INVENTOR.
Philip E. Ohmart.
BY
Wood, Herron & Evans.
ATTORNEYS.

Sept. 18, 1956 P. E. OHMART 2,763,789
CONTROL DEVICE
Filed March 3, 1953 2 Sheets—Sheet 2
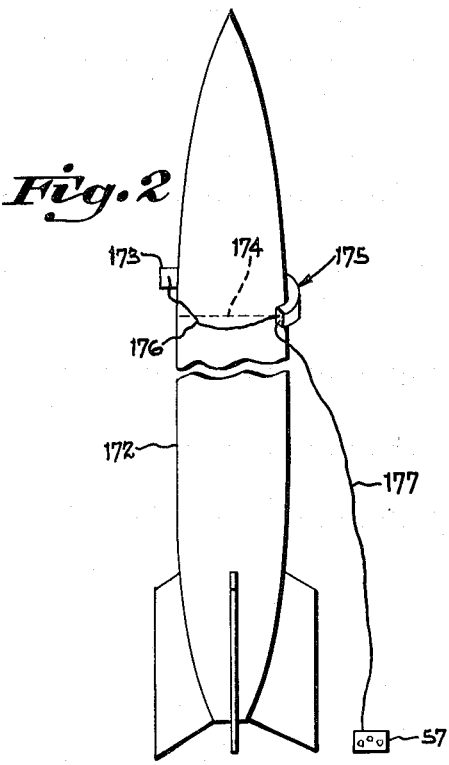
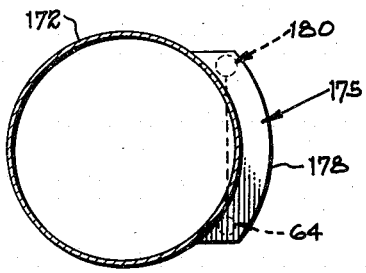
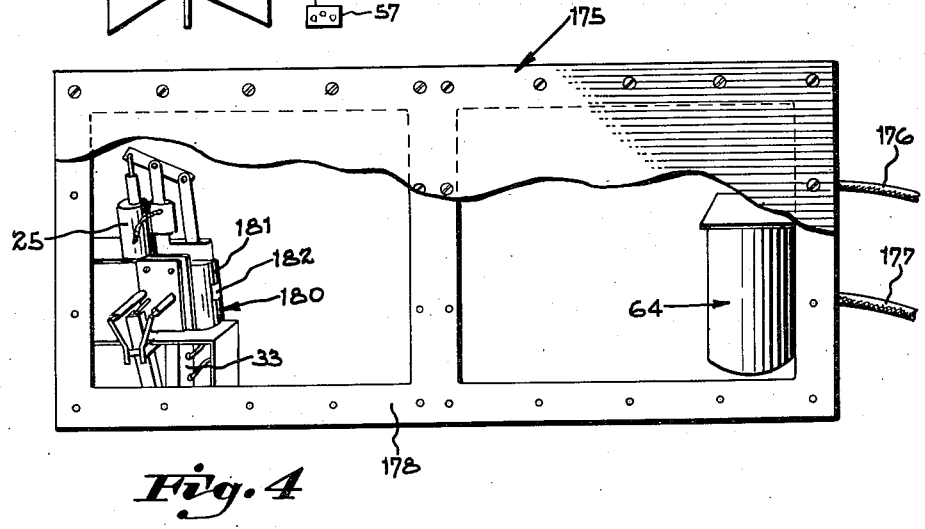
INVENTOR.
Philip E. Ohmart.
BY
Wood, Herron & Evans.
ATTORNEYS.

United States Patent Office 2,763,789
Patented Sept. 18, 1956

2,763,789

CONTROL DEVICE

Philip E. Ohmart, Cincinnati, Ohio, assignor to The Ohmart Corporation, Cincinnati, Ohio, a corporation of Ohio Application March 3, 1953, Serial No. 340,108

21 Claims. (Cl. 250—83.6)

This invention relates to devices for controlling, measuring, or indicating, the value of a variable condition such as pressure, liquid level, density, or displacement, and is particularly directed to a device utilizing one or more radiant energy electric generators, or Ohmart cells as condition sensing elements.

At the present time, there are many processs having one or more variable conditions which it is desirable to accurately control so that a uniform end product will be produced. For example, in the solvent refining of oils, two layers of immiscible liquids are produced in a still, the still having suitable outlets, or draw off lines, for withdrawing one or the other of the liquids. It is desirable to maintain the liquid interface at a predetermined height so that only one of the liquids will be withdrawn through any one outlet. In such a still, control over the interface is exercised by controlling either a valve in the draw off line, or a valve in the inlet line. The maintenance of a selected liquid level in such a process is also highly desirable in order to secure a proper heat balance.

A second example of a process in which it is desirable to control a variable condition is the isomerization of hydrocarbons by means of a contacting liquid isomerization catalyst in a reaction tower. In such a tower, the hydrocarbons rise in liquid phase through a column of liquid catalyst to form a body of liquid hydrocarbons above the surface of the liquid catalyst. It is desirable to maintain the level of the interface between those liquids within narrow limits, and one or more inlet and outlet valves are provided to accomplish this function.

Also, there are many operations in which it is desirable to regulate a mechanism so that the results obtained from the operation will conform closely to a given standard. For example, it is often desirable to fill a container with liquid precisely to a predetermined height, and to close off the feed line to the container as soon as the liquid reaches this level. As an illustration, the fuel tanks of rockets and other devices are often filled to a precise height with a liquid fuel so that the performance of the apparatus can be experimentally evaluated.

It is the principal object of the present invention to provide a rapid response control device for regulating the value of a variable condition in such a process or operation, so that the variable condition can be maintained within narrowly defined limits.

In its broadest aspect, the present invention contemplates a control device including a condition sensing element for producing an electrical signal correlated with the value of the variable condition, and a suitable circuit for periodically comparing this signal, or a corresponding amplified signal, with a standard reference signal. The circuit is arranged so that the signal produced by the sensing element is equal to the reference signal when the value of variable condition coincides with the desired value; and the control circuit is triggered as soon as the condition sensing signal exceeds the reference signal. Depending upon the particular application, the control circuit, when triggered, is effective to energize apparatus for preventing further change of the variable condition, or for driving the variable condition back toward its selected value.

More specifically, the present invention is directed to a control device employing a radiant energy electric generator, or Ohmart cell as a condition sensing element. As explained in my copending applications entitled "Ohmart Cells for Measuring Radiation," Serial No. 259,341, filed December 1, 1951; "Method of Converting Ionic Energy Into Electrical Energy," Serial No. 266,883, filed January 17, 1952; and "Comparator," Serial No. 280,842, filed April 5, 1952, an Ohmart cell will tend to generate a current whenever it is exposed to radiant energy and the magnitude of this current is affected by various factors. Consequently a cell may be used to index these factors, or conditions.

More particularly as explained in these applications, all other factors being held constant, the current which is produced by radiant energy electric generator, and which will flow through an external circuit connecting the cell electrodes, will vary in a predetermined manner with the density of the impinging ionizing energy. This ionizing energy may be obtained from any number of sources; for example radioactive material such as strontium 90, X-ray tubes, and ultraviolet lamps.

This characteristic of an Ohmart cell is useful for purposes other than measuring radiant intensity, since by arranging a source of radiant energy and an Ohmart cell in such a manner that the density of the impinging energy varies in accordance with variations in the condition to be measured, the current developed by the cell can be used as an index of the variable condition.

The theory of Ohmart cell operation, and the details of cell construction, are described in greater detail in the above mentioned copending applications. It will suffice here to state that essentially an Ohmart cell comprises three elements: a first electrode, a second electrode chemically dissimilar from the first, and electrically insulated from it, and an ionizable gas in contact with the two. Due to the chemical asymmetry of the electrodes, a field bias is created between them. When the gas is ionized by the impingement of ionizing radiation, or by secondary radiation, in turn caused by the ionizing energy, there will be discriminatory migration of the ions toward the electrodes. The positive ions will move toward the more noble electrode, and the negatively charged electrons will move toward the more active electrode. These particles will collect on the respective electrodes, causing a potential difference to be built up between them.

If an external leakage path is provided between the electrodes, the electrons will pass through the external path from the negative electrode toward the positive electrode where they neutralize the positive ions to form gas molecules. For each electron that is picked up by a positive ion, an additional electron will flow through the external circuit from the negative to the positive electrode. The rate of current flow is dependent upon the density of the impinging ionizing energy, and the impedance of the external circuit.

In accordance with this invention the external circuit of the Ohmart cell includes a sampling capacitance together with suitable switch means for periodically short circuiting the cell and the capacitance. When the capacitance is short circuited it discharges producing a pulse which is fed to a suitable amplifier. The output of the amplifier is connected to a trigger circuit including means for comparing the amplified pulse with a reference voltage corresponding to the magnitude of the amplified pulse produced when the variable condition is of the desired value. The trigger circuit is arranged so that when the amplified pulse exceeds the reference signal the circuit is actuated to energize any suitable mechanism for either stopping further change in the variable condition, or alternatively restoring it to its desired value.

More specifically one preferred embodiment of my control device comprises an Ohmart cell in circuit connection with a capacitor, and a cycling switch effective to ground the capacitor and cell at regular timed intervals. For example, the switch can be arranged to close every second, remaining closed for perhaps a fourth of a second on each closing. An amplifier, including a vacuum tube having a control grid connected to the capacitor, is provided for amplifying the pulse produced by the capacitor when grounded. The output signal of the amplifier is fed to a trigger circuit preferably including one or more unstable multivibrators. A reference potential is provided in the form of a bias applied to the first control grid of the multivibrator. The multivibrator circuit is arranged so that when the magnitude of the amplifier output exceeds that of the grid bias the multivibrator is driven to its unstable condition in which it is effective to actuate a relay which in turn completes a power circuit to suitable apparatus for affecting the process or operation being controlled. On the other hand, when the amplifier output is less than the reference signal the multivibrator remains in its stable condition wherein its associated relays energize apparatus for affecting the process or operation in the opposite manner.

To illustrate the manner in which control can be exercised over a variable condition by means of this arrangement, suppose that it is desired to control apparatus for filling a container with liquid so that the container will be filled to a predetermined height. It will be understood that while this particular control function is discussed here and a suitable device for carrying out this function is disclosed in part in more detail in the following description of the drawings, my invention is not limited to liquid level control. Ths particular application has been chosen merely for purposes of illustration and it will be apparent to those skilled in the art how any other condition which will affect the current produced or potential developed by an Ohmart cell can be controlled in accordance with this invention.

If it is desired to control the level to which the container is filled with liquid, a source of ionizing energy, for example a gamma emitter, is disposed at substantially the level at which it is desired to fill the tank. An Ohmart cell is then disposed adjacent the container at substantially the same level but is displaced from the source so that a portion of the radiation emitted from the source passes through the container before impinging upon the Ohmart cell. The tank walls, interposed between the cell and its associated source of radiation, will obsorb a certain amount of the ionizing energy emitted from the source so that the radiant internsity will be somewhat attenuated before it impinges upon the cell.

As the liquid within the container approaches the predetermined level it too will absorb a portion of the ionizing energy and will further attentuate the energy effective to ionize the gas within the Ohmart cell. Other factors remaining constant, the degree of attenuation will be dependent upon the height of the liquid interposed between the radiant source and the cell.

At the beginning of the filling operation the Ohmart cell is short circuited by the cycling switch. The short circuit is then removed and the current output of the cell applied to a sampling capacitor. After a predetermined time interval, the sampling capacitor is short circuited, causing the capacitor and self capacitance of the cell to produce a pulse. This pulse is amplified and compared with a predetermined reference potential represented by the bias on the control grid of the multivibrator. So long as the liquid is below the desired level, the magnitude of the amplified capacitor charge exceeds the amplitude of the bias. This pulse triggers the multivibrator, driving it temporarily to its unstable state so that a relay is energized to actuate the filling apparatus. A suitable hold-in arrangement is provided so that the relay will remain energized from one pulsing of the sampling capacitor to the next. The details of this arrangement will be explained later.

The cycling switch periodically pulses the sampling capacitor in the manner just described and so long as the liquid level is below the desired level the amplified pulse will be effective to actuate the trigger circuit each cycle, thereby energizing the filling apparatus.

When the liquid reaches the predetermined level, the current produced by the Ohmart cell is decreased and the charge built up on the sampling condensor is diminished. As a result when that capacitor is short circuited and its pulse amplified, the amplified pulse is smaller than the bias on the multivibrator and the multivibrator is not triggered. Consequently, the relay completing the circuit to the filling apparatus is opened and preferably a circuit to an electrically responsive valve is completed to close the filling line. Each of the pulses produced by the sampling capacitor after the liquid has reached the predetermined level will likewise be ineffective to trigger the multivibrator circuit. The filling operation will thus be halted when the liquid has reached the desired level.

It will be appreciated that the current developed by an Ohmart cell of a size suitable for most installations is extremely minute, being generally of the order of $10^{-12}$ ampere. It is one of the principal objects of this invention to provide a circuit in which a current of this extremely small magnitude is effective to provide rapid accurate control over the variable condition.

It is not feasible simply to amplify these minute currents to obtain the necessary power for operating control apparatus. Amplifiers having the gain characteristics requisite for suitable amplifiaction of currents of this magnitude are notorious for their gain instability and zero drift. I have determined however, that these minute currents can be effectively utilized for control signals by employing them to charge a sampling capacitor which is periodically pulsed by a cycling switch to provide a signal which can be amplified and compared with a reference signal of a trigger circuit.

Hence one advantage of the preferred embodiment of the control device is that despite the fact that it employs a direct current source, an Ohmart cell, as a condition sensing element, it nevertheless employs an A. C. amplifier. Consequently, the many inaccuracies introduced in a control system by the notorious gain instability and zero drift of a D. C. amplifier are eliminated. Specifically, the elimination of the D. C. amplifier results from the employment of a sampling capacitor in combination with a periodic cycling switch which is effective to pulse the capacitor at predetermined time intervals.

A second extremely important advantage which is obtained through the use of a sampling capacitor and cycling switch is that the Ohmart cell is always operated at its maximum sensitivity. That is, any change in the variable condition results in a maximum corresponding change in the current output of the Ohmart cell. As explained in my copending application on "Method of Converting Ionic Energy Into Electrical Energy," the ion collection efficiency of any pair of cell electrodes is greatest when the electrodes are at relatively low potentials. The asymmetrical field of the electrodes can effectively influence all of the ions formed only so long as the potential of the cell remains below a critical value, of the order of five to eight-tenths of the open circuit voltage of the cell. Should the potential of the cell build up above this critical value, the field is no longer effective to influence all of the ions produced, and a further increase in the ionizing radiations will not result in an appreciable current increase.

However, as long as the cell is operated so that its closed circuit voltage remains below the critical value, there will be a maximum change in closed circuit voltage in response to a given change in radiant intensity. Hence, the cell is most sensitive to changes in the intensity of ionizing radiations and consequently to changes in the variable condition attenuating these radiations when operated below the critical value.

In the present control system the Ohmart cell is short circuited by the cycling switch when the sampling capacitor is pulsed. When the switch is open a charge is built up upon the sampling capacitor and the potential of the cell electrodes increases. However the capacitor is pulsed and the cell short circuited at intervals less than that required by the cell to reach its critical potential. In other words, in the preferred embodiment the cell is always operated in a voltage range varying from a short circuit condition to a low potential, less than its critical value. Therefore, the sensitivity of the cell to changes in ionizing intensity is always maximum.

It can thus be seen that the sampling capacitor, cycling switch combination, performs a triple function. In the first place, it provides for rapid response by establishing short cycles of measurement; secondly, it facilitates the use of an A. C. amplifier in conjunction with a direct current source; and thirdly, it functions to continually condition the Ohmart cell so that it operates under conditions of maximum sensitivity.

Another of the advantages of employing a cycling switch shunting the Ohmart cell as well as the sampling capacitor, is that it provides for extreme accuracy in measurement, especially when rapid response is desired. In the preferred embodiment the cycling switch short circuits the Ohmart cell prior to each period of charge of the sampling condenser. In so doing, it provides a low impedance path between the cell electrodes, causing a maximum current flow and a maximum rate of neutralization of the residual ions previously formed by the impingement of the ionizing energy. As a result, during each period of charge of the sampling condenser, the current output of the Ohmart cell accurately reflects only the amount of energy currently impinging upon the cell, and is not affected by the density of the ion plasma formed by earlier impingement.

While I have thus far discussed the control device as employing a single Ohmart cell, it will be appreciated that the condition sensing element can be constituted by a combination of Ohmart cells; for example, the opposed cells shown in my copending application on "Comparator." When cells in opposition are used as conditioning sensing elements, one electrode junction is grounded, and the other junction is connected to the sampling capacitor. As explained in my copending application, changes in a variable condition result in variations in the potential balance of the cell, causing a current flow between them. This current flow can be employed in the same manner as that in which the output current of a single current is employed.

While the combination of a sampling capacitor, cycling switch, amplifier and unistable multi-vibrator provides unique advantages when employed with an Ohmart cell functioning as a sensing element, it will be appreciated that this combination nevertheless retains some of these advantages when employed with other condition sensing elements; for example, ionization chambers, temperature sensitive resistors, variable capacitors, and the like. When a condition sensing element other than an Ohmart cell is employed, the element is arranged together with a source of potential so that the current flow through the condition sensing element is employed to charge the sampling capacitor. The capacitor is periodically pulsed, and the charge on the capacitor is amplified and compared with a bias current in a multi-vibrator circuit as explained above.

One example of a device embodying some of the principles of this invention and employing a condition sensing element other than an Ohmart cell, is a pH control including a glass-calomel electrode pair. Such an electrode pair produces no appreciable current, but if connected to a high impedance will develop a potential of the order of 59 millivolts per pH. I have determined that the extremely minute currents produced by such an electrode pair, and the variations of potential with pH concentration can be used to provide rapid and accurate pH control by means of a sampling capacitor, cycling switch, amplifier and trigger circuit arranged as described above.

These, and other advantages of the present invention, will be apparent from a consideration of the following detailed description of the drawings illustrating one preferred embodiment of the invention. In the drawings:

Figure 2 is a partial diagrammatic elevational view of a container and control device showing the manner in which an Ohmart cell and source are employed.

Figure 3 is a sectional view through the liquid container shown in Figure 2.

Figure 4 is an elevational view showing the arrangement of the source, and shield, their associated relays, and the Ohmart cell.

Figure 1:
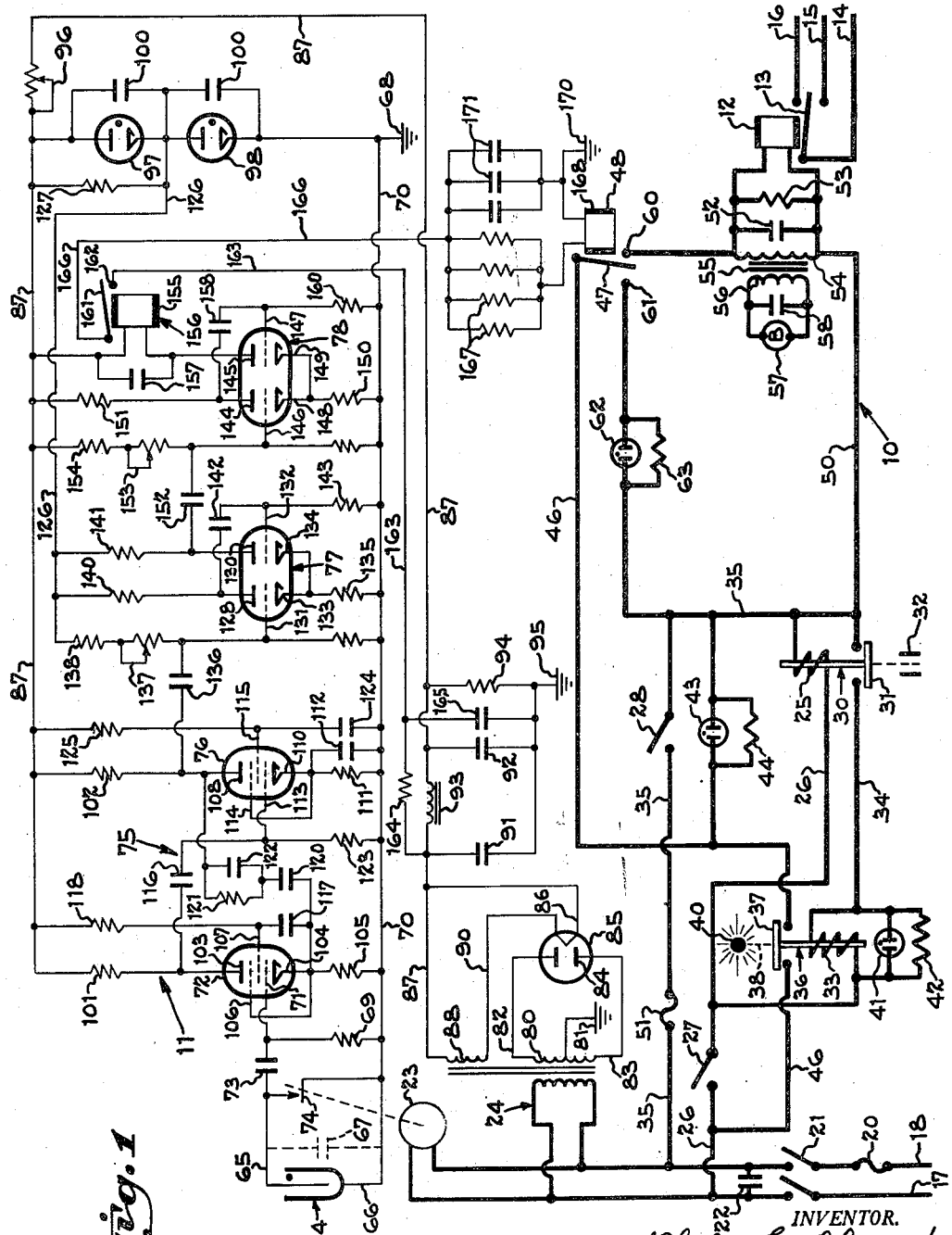
Figure 1 is a schematic circuit diagram of a control circuit, constructed in accordance with this invention, and especially adapted for use with container filling apparatus.

Figure 1 is a schematic circuit diagram of one preferred form of control circuit showing the manner in which such a circuit can be used to operate an automatic cutoff device. The circuit shown is particularly suited for employment with rocket fueling apparatus, and functions to energize a pump, or similar device, to supply fuel and then to deenergize the pump and close an electrically responsive valve when a predetermined amount of fuel has been inserted into the rocket fuel chamber.

However, from the preceding disclosure of the general principles of the invention, and from the following detailed description of a preferred embodiment, those skilled in the art will readily comprehend the various modifications which can be made within the scope of this invention to adapt the apparatus for control of a wide variety of variable conditions other than changing liquid level.

Generally, the device shown includes a power circuit 10, shown in heavy lines, a control circuit 11, shown in light lines, for opening a branch of the power circuit to deenergize relay 12 whenever the liquid level within the rocket fuel chamber exceeds a predetermined height. Relay 12 is provided with a contact arm 13, the position of which governs the operation of the filling apparatus. Arm 13 is connected to line 14, and adapted to contact either line 15 or line 16, these lines being arranged so that the liquid fueling apparatus is energized when relay arm 13 completes the circuit to line 16 and the shutoff apparatus, for example, an electrically responsive valve is energized when the relay closes the circuit to line 15. Power circuit 10 includes main power lines 17 and 18 containing fuse 20, double pole, single throw switch 21, and capacitor 22. The power lines are effective to energize cycling motor 23 which is preferably a small synchronous motor, the function of which will be described later, and main power transformer 24.

A shield positioning relay 25 is connected across lines 17 and 18 through line 26, normally closed switch 27, and switch 28. This relay includes an armature 30 which is provided with contact 31, and is mechanically interconnected with shield 32. When relay 25 is energized by closing switch 28, contact 31 completes a circuit to the source positioning relay 33 through line 26, switch 27 and lines 34 and 35; source relay 33 is provided with an armature 36 having contact 37 and a mechanical coupling 38 for shifting radioactive source 40.

The parallel combination of neon bulb 41, and resistor 42, shunts relay coil 33 to provide a visual indication when that coil is energized. Similarly, relay coil 25 is shunted by the parallel combination of neon bulb 43 and resistor 44. Power circuit 10 also includes the coil of relay 12 which is adapted to be energized from main power lines 17 and 18 through lines 26 and 46, relay contact 37, contact 47 of control relay 48, and line 50, which is returned to power line 18 through line 35, switch 28, fuse 51. The coil of relay 12 is shunted by capacitor 52, resistor 53, and primary winding 54 of transformer 55. The transformer includes a secondary winding 56 connected across buzzer 57, the buzzer being shunted by capacitor 58.

Control relay 48 is a two-position relay, arm 47 being adapted to engage contact 60 when the relay is energized, and 61 when no current is flowing through its coil. When contact arm 47 is in engagement with contact 61, the circuit to relay coil 12 is opened, but a circuit containing indicating bulb 62 and its shunting resistance 63 is completed. When the control relay is energized, however, the circuit is completed to relay 12. The function of the control circuit 11 is to govern the energization to relay 48. It will be apparent to those skilled in the art, and I shall explain briefly below the manner in which the control circuit may be used to accomplish any of a large number of control functions, by merely inserting control relay 48 in various power circuits.

The control circuit 11, shown in light lines in Figure 1, includes an Ohmart cell radiant energy electric generator 64 having a positive electrode 65, negative electrode 66, and a self-capacitance 67. The negative electrode is grounded as at 68 by means of ground lead 70; while the positive electrode is connected to one end of sampling capacitor 73. The other end of the sampling capacitor is grounded through resistor 69, and is connected to the control grid 71 of vacuum tube 72. The positive and negative electrodes of the Ohmart cell are shunted by cycling switch 74, which is mechanically driven by motor 23 in such a manner that it opens and closes at regular periodic intervals. Tubes 72 and 76 constitute a two-stage amplifier 75 for amplifying the signal applied to control grid 71. The output of amplifier 75 is supplied to two unistable multi-vibrators. The signal is compared with a predetermined reference potential and if its magnitude exceeds the reference potential, the multi-vibrators are triggered closing the circuit to relay 48.

Plate voltage for two-stage amplifier 75 and multi-vibrators 77 and 78 is supplied from a conventional B plus power source, including a secondary 80 of main power transformer 24. Secondary winding 80 has a grounded center tap 81, and two end taps 82 and 83 which are connected to the anodes 84 of full wave rectifier tube 85. The cathode 86 of this tube is connected to power lead 87, the cathode heater being energized from secondary 88 of main transformer 24 through line 87 and lead 90.

B plus line 87 is connected to a capacitor input filter including capacitors 91 and 92, choke 93 and resistor 94, the capacitors and resistor being grounded as at 95. A potentiometer 96 is inserted in the line, and a voltage regulator is provided in the form of two series connected voltage regulator tubes 97 and 98 which are connected to line 87, and to ground line 70. Each of the voltage regulator tubes is shunted by a capacitor 100. The plate voltage for amplifier tubes 72 and 76 is obtained from line 87 through resistors 101 and 102.

Tube 72 includes plate 103, cathode 104 which is connected to ground line 70 through resistor 105, suppressor 106 and screen 107. Tube 76 includes plate 108, grid 110, which is grounded through the parallel combination of resistor 111 and capacitor 112, control grid 113, suppressor 114, and screen 115. It will be understood that tubes 72 and 76, as well as the multi-vibrator tubes, are provided with conventional cathode heaters which are here omitted for the sake of clarity.

Plate 103 of tube 72 is coupled with grid 113 of tube 76 through capacitor 116. A conventional by-pass filter capacitor 117 is provided between the screen 107 and grid 104, the screen voltage being obtained from lead 87 through resistor 118. Cathode 104 of tube 72 is also connected to plate 108 of tube 76 through capacitor 120 in series with the parallel combination of resistor 121 and capacitor 122; these elements constituting a negative feed back path for increasing amplifier stability. Grid 113 of tube 76 is connected to ground line 70 through resistor 123, while the screen is grounded through capacitor 124, the screen voltage being supplied from line 87 through resistor 125.

The plate voltage for the multi-vibrators is taken from lead 126, which is connected between the voltage regulator tubes 97 and 98, and is joined to line 87 through resistor 127. Tube 77 is a double triode, including plates 128 and 130, control grids 131 and 132 and cathodes 133 and 134, which are tied together and connected to ground line 70 through resistor 135; control grid 131 is coupled to plate 108 of amplifier tube 76 through condenser 136. The control grid is also connected to a source of bias voltage through potentiometer 137 and resistor 138 which is in turn joined to line 126.

Voltage for plates 128 and 130 is obtained from line 126 through resistors 140 and 141; plate 128 is also tied to grid 132 through condenser 142, the grid being connected to the ground line 70 through resistor 143.

Tube 78 is a tube similar to tube 77, and includes plates 144 and 145, control grids 146 and 147, and cathodes 148 and 149. The cathodes are tied together, and are connected to the ground line through resistor 150. Plate 144 is connected to line 87 through resistor 151, while its associated grid 146 is coupled to plate 130 through capacitor 152. Positive bias for grid 146 is supplied through the series combination of potentiometer 153 and resistor 154 which are joined to line 87. Plate 145 is connected to line 87 through coil 155 of relay 156, the relay coil being shunted by capacitor 157. Grid 147 is tied to plate 144 through capacitor 158, and is connected to ground through resistor 160.

Relay 156 is provided with a relay arm 161 adapted to engage contact 162 when the relay is energized. Contact 162 is connected to lead 163, which is in turn joined to line 87 through resistor 164, a filter condenser 165 being connected across line 163 to ground. Line 166 is joined to relay arm 161, and to a group of parallel resistors 167, the opposite ends of resistors 167 being connected to one side of coil 168 of relay 48. The opposite end of the relay coil is grounded as at 170, and is connected to a plurality of parallel condensers 171 which are also tied to lead 166.

Figure 2 shows diagrammatically the manner in which the control device is employed for controlling the filling of a rocket fuel chamber. As shown, a rocket 172 is disposed in a vertical position prior to launching; the rocket is supported on a suitable launching platform which is not shown. Fuel is inserted in the rocket fuel chamber by means of suitable apparatus 173 shortly before the rocket is launched. In rockets of the V-2 type, this fuel chamber is approximately thirty-five feet above the ground, and the fueling apparatus 173 preferably includes an electrically responsive pump and one or more electrically responsive valves. For various reasons, it is desirable to fill the rocket with fuel precisely to a predetermined level indicated by dotted lines 174. A control device 175, including the circuit elements shown in Figure 1, is mounted adjacent to the rocket at the desired liquid level. The control device includes suitable wiring 176 interconnecting it to the fueling apparatus, and other wiring 177 interconnecting it with appropriate signal means, such as buzzer 57 and neon bulb 62, by means of which an operator located on the ground can ascertain the manner in which the apparatus is working.

Figures 3 and 4 indicate somewhat diagrammatically one preferred arrangement of radioactive source and Ohmart cell, within the control device. As shown in these views, the control device 175 includes a housing 178 arcuately configured to conform with the outer surface of the rocket. An Ohmart cell 64 is mounted within the housing at one end thereof, while a source assembly 180 is mounted within the housing at the other end thereof. Source assembly 180 includes a suitable casing 181, constructed of lead, or some similar material, for housing the radioactive material.

The casing includes an opening 182 facing Ohmart cell 64; shield 32 is mounted for movement within casing 181 to a position in which it covers window 182, and to a position remote from the window. Radioactive source 40 is similarly mounted for movement within the casing to a storage position, preferably centrally located, and to an exposure position adjacent window 182. Shield relay 25, and source relay 36, are provided for respectively positioning the shield and source.

As shown in Figure 3, the shield, Ohmart cell 64, and source 40, are mounted relative to the rocket so that a portion of the radiations emitted from the source pass through the rocket walls and the interior of the fuel chamber before impinging upon the Ohmart cell. The intensity of these radiations is attenuated by the walls which are effective to stop a portion of the radiation. Obviously, this radiation is further attenuated when the liquid level rises to a point in the fuel chamber where it too is interposed between the source and Ohmart cell. Consequently, the current output of the Ohmart cell is effective to index the height of liquid within the rocket fuel chamber. The manner in which this apparatus is used to control the fueling of a rocket is explained below.

At the start of the filling operation, switches 21 and 28 are closed to energize the power transformer 24, shield positioning relay 25, and source positioning relay 33. This raises shield 32, so that opening 182 in casing 181 is uncovered, while simultaneously the source 40 is shifted from its central position to its position adjacent the opening 182. Synchronous motor 23 is driven at a predetermined rate, and through the mechanical interconnection operates switch 74 so that the switch is closed at regular periodic intervals. For example, the switch may be closed once every second, being held closed for a period in the neighborhood of one fourth of a second.

The time intervals during which the switch is held open and closed depend upon several factors. In the first place, the period during which the switch is held open is correlated with the size of the Ohmart cell and the sampling capacitor 73, so that the Ohmart cell develops a potential somewhat below its critical value before it is shunted and the sampling capacitor pulsed. The length of the period during which the switch is held open is determined partly by the desired rapidity of response of the control apparatus. This period may vary from a tenth of a second to several hours. The time during which the switch is held closed is especially important when a rapid, accurate response is desired. For it is during the period when the switch is closed, that the ions remaining in the cell from previous exposure to the radiant energy are neutralized.

It will be appreciated that the ionizing energy is effective to create a plasma of ions, while these ions migrate toward the electrodes at a relatively slow rate. Consequently, the density of the ion plasma does not change in exact conformity with changes in radiant intensity, but instead there is a lag introduced by the uncollected ions previously formed. However, by shunting the electrodes with the cycling switch, these residual ions are neutralized during the period of maximum current flow accompanying the short circuit condition. Consequently, the current developed by the cell during each period of sampling condenser charge accurately reflects the ionization to which the cell is currently subjected.

The exact length of time during which the switch should be held closed varies with the length of the cycling time, the cell construction, type and amount of radioactivity, and other factors. I have experimentally determined that for a cycling time of one second, good results are obtained if the switch is held closed for approximately one fourth of a second.

So long as the liquid in the tank remains below the selected level, the radiation impinging upon the Ohmart cell 64 will not be attenuated by the liquid. Consequently, the cell will produce a maximum current which will start to flow as soon as switch 24 is open, and will charge the self-capacitance of the cell and capacitor 73. When the switch is closed by motor 23, the two electrodes of the Ohmart cell are shunted, and capacitor 73 is grounded through line 70. Thereafter, the sampling capacitor will discharge, causing a negative pulse to appear on control grid 71 of tube 72. Vacuum tube 72 is conductive at all times, so that the negative pulse on the grid results in an amplified positive pulse in the plate circuit of the tube which is connected to control grid 113 of tube 76 through capacitor 116. This positive pulse is further amplified by tube 76, and appears as a negative pulse in the plate circuit of that tube.

The plate of tube 76 is connected to control grid 131 of multi-vibrator tube 77. The negative pulse when applied to control grid 131 is sufficient to overcome the positive bias on the grid and cause conduction to cease between anode 128 and cathode 133. That is, a maximum charge is built up on condenser 73 whenever the liquid level is below the selected level, and therefore does attenuate the radiation impinging upon the Ohmart cell. This pulse, when amplified by amplifier 75, is sufficiently large to overcome the positive bias on control grid 131 supplied by potentiometer 137, and cause the associated anode and cathode of the grid to cease conduction.

Consequently, a positive pulse is produced in the anode circuit of the first half of double triode 77. The anode 128 is coupled through capacitor 142 to control grid 132 of the second triode of the tube. This positive pulse on grid 132 causes conduction to begin between anode 130 and cathode 134. Conduction will continue between these two elements until the charge on the capacitor 142 leaks off, at which time conduction is resumed between plate 131 and cathode 133 (the negative amplifier pulse no longer being applied to their associated control grid). Thus, multi-vibrator 77 is unstable; that is, it has only a single stable condition in which conduction occurs only between cathode 128 and plate 133. Although a pulse on control grid 131 may alter this condition temporarily to cause conduction between the other anode and cathode, the tube will always return to the condition in which anode 128 and cathode 133 are conductive.

On the cycle being described, when conduction commences between plate 130 and cathode 134, a negative pulse is produced in the plane circuit; this pulse is applied through capacitor 152 to the control grid 146 of the second multi-vibrator tube 78. This tube functions in exactly the same manner as the previous multi-vibrator tube, in that the negative pulse overcomes the positive bias on the control grid and causes conduction to cease between anode 144 and cathode 143. This results in a positive pulse in the plate circuit and on control grid 147, so that conduction begins between anode 145 and cathode 149. The anode tank circuit of this triode includes coil 155 of relay 156, so that the relay is energized, closing the circuit to line 166. This causes capacitor 165 to discharge, and a current to flow through resistors 167 and coil 168 of relay 48; simultaneously charging capacitors 171.

The energization of relay coil 168 causes the power circuit branch containing relay 12 to be closed; this in turn completes the circuit to line 16, causing the filling apparatus to be energized. Capacitor 165 and capacitors 171 are made sufficiently large so that after relay 156 opens, the discharge from capacitors 171 is sufficient to hold in relay 48 for a time equal to one cycle of switch 74. Hence, so long as the liquid level remains below the selected level, the multi-vibrator will be triggered each cycle, and capacitors 171 will be continuously effective to hold relay 40 in.

The operation of the control circuit continues in this manner until the level of the fuel within the chamber reaches the selected height. At this time the fuel absorbs a portion of the radiation from source 40, and is thereby effective to substantially attenuate the radiation impinging upon the Ohmart cell. This results in a lower current output of the cell, and a lower charge's being built up on sampling capacitor 73 before the cycling switch 74 is closed. When the switch is closed, capacitor 73 causes a negative pulse of lower magnitude than that previously produced to be applied to tube 72, and this pulse is again amplified and applied to grid 131 of multi-vibrator 77. However, potentiometer 137 is adjusted in such a manner that the bias of grid 131 exceeds the amplified pulse produced when the liquid level is at the desired level. Therefore, the pulse does not overcome the bias, and is ineffective to stop conduction between cathode 128 and anode 133. As a result, the two multi-vibrators remain in their stable condition, and there is no conduction between anode 145 and cathode 149 of the second multi-vibrator tube. Consequently, the anode circuit containing relay coil 155 remains open, and the circuit to relay coil 168 is likewise open. The charge on capacitors 171 decays from the time of the opening of relay 156 in the previous cycle; and during the ensuing cycle drops below a level sufficient to produce a current flow effective to hold that relay in. As a result, contact arm 47 is disengaged from contact 60 and engages contact 61.

This results in the opening of the power circuit branch containing power relay 12, so that arm 13 of that relay is shifted from a contact in line 16 to a contact in line 15. This causes the filling apparatus to be deenergized, and an electrically responsive valve, or similar means, to be closed to stop the filling of the tank. At this point, the operation of the control device is completed, and switches 21 and 28 can be opened. However, it will be apparent that any operating cycles of the control circuit occurring before the opening of these switches will follow the same pattern as that of the cycle just described, so that the condition of the power circuit will not be altered.

It will be obvious that many modifications can be made in the device described to adapt it for particular control functions. For example, if it is desired to establish three-way control, that is to actuate various apparatus in accordance with whether a condition is below a predetermined lower level, intermediate the lower level and a predetermined upper level, or above the upper level, the same basic circuit described above is employed, and a second trigger circuit is connected to the amplifier output leads.

This second trigger circuit is also actuable in response to the comparison of the amplified sampling pulse and a predetermined bias voltage. However, a different bias is applied to each trigger circuit; one of the trigger circuits has a bias signal corresponding to the output of the amplifier output when the variable condition is at its lower predetermined value, and the other trigger circuit has a bias potential corresponding to the amplified output when the variable condition is at the higher predetermined level. The output of each of the trigger circuits is employed to energize suitable apparatus.

To use the principles of this invention in constructing a measuring device, a flasher such as a neon bulb is placed in circuit connection with the anode 130-cathode 134 circuit of tube 77. If only indication, and not indication and control, is desired, the components of the trigger circuit associated with the second multi-vibrator tube can be omitted, as well as the power circuits for the control relay.

The operation of the measuring device is as follows: the current produced by the sensing element is employed to charge sampling capacitor 73, which is periodically discharged by means of switch 74 as explained above. The pulse provided by the capacitor is amplified and applied to grid 131 of a tube such as tube 77.

Bias potentiometer 137 controlling the bias on grid 131, is adjusted until tube 77 is triggered by the amplifier output, or just fails to trigger, as indicated by the flashing light. Potentiometer 137 is provided with a suitably calibrated dial by means of which the value of the variable condition can be directly determined from the potentiometer setting required to balance the amplifier output.

Other modifications of the apparatus disclosed will readily suggest themselves to those skilled in the art.

Having described my invention I claim:

1. A control device comprising a condition sensing element effective to vary an electrical current flow in accordance with the value of a variable condition, a sampling capacitor in circuit connection with the condition sensing element, means for periodically discharging the sampling capacitor whereby a pulse of current is produced, means for amplifying said current pulse, means for producing a reference signal of a predetermined magnitude, means for comparing said amplified pulse with said reference signal, and a trigger circuit responsive to said comparison.

2. A control device comprising a condition sensing element effective to vary an electrical current flow in accordance with the value of a variable condition, a sampling capacitor in circuit connection with the condition sensing element, means for periodically discharging the sampling capacitor whereby a pulse of current is produced, means for amplifying said current pulse, means for producing a reference signal of a predetermined magnitude, means for comparing said amplified pulse with said reference signal, a trigger circuit responsive to said comparison, and apparatus for affecting the variable condition, said trigger circuit being effective to control the operation of said apparatus.

3. A device for controlling a variable condition, said device comprising a radiant energy electric generator, a source of ionizing energy, said radiant energy electric generator being disposed relative to said source of ionizing energy so that the variable condition affects the amount of ionizing energy impinging upon said generator, a sampling capacitor in circuit connection with the generator, means for periodically short circuiting the sampling capacitor whereby a pulse of current is formed, means for amplifying said current pulse, means for producing a reference signal of predetermined magnitude, means for comparing said amplified pulse with said reference signal, and a trigger circuit responsive to said comparison.

4. A control device comprising a condition sensing element effective to vary an electrical current flow in accordance with the value of a variable condition, a sampling capacitor in circuit connection with the condition sensing element, means for periodically short circuiting the sampling capacitor whereby a pulse of current is produced, an amplifier for amplifying said current pulse, a trigger circuit including a unistable multivibrator having a first control grid in circuit connection with the output of said amplifier, means for applying a predetermined bias to said first control grid, said multivibrator being driven to an unstable condition when the output of said amplifier exceeds said control bias, said trigger circuit being effective to energize apparatus for affecting said variable condition when said multivibrator is driven to said unstable condition.

5. A device for controlling a variable condition, said device comprising a radiant energy electric generator, a source of ionizing energy, said radiant energy electric generator being disposed relative to said source of ionizing energy so that the variable condition affects the amount of ionizing energy impinging upon said cell, a sampling capacitor in circuit connection with the generator, means for periodically short circuiting the sampling capacitor whereby a pulse of current is formed, means for simultaneously short circuiting said radiant energy electric generator, means for amplifying said current pulse, means for producing a reference signal of predetermined amplitude, means for comparing said amplified pulse with said reference signal, and a trigger circuit responsive to said comparison.

6. A control device comprising a condition sensing element effective to vary an electrical current flow in accordance with the value of a variable condition, a sampling capacitor in circuit connection with the condition sensing element, means for periodically short circuiting the sampling capacitor whereby a pulse of current is produced, an amplifier for amplifying said current pulse, a trigger circuit including a unistable multivibrator having a first control grid in circuit connection with the output of said amplifier, means for applying a predetermined bias to said first control grid, said multivibrator being driven to an unstable condition when the output of said amplifier exceeds said control bias, said trigger circuit being effective to energize apparatus for affecting said variable condition when said multivibrator is driven to said unstable condition, means for maintaining said apparatus in an energized condition for a period of time equal to the time between successive short circuitings of said sampling capacitor.

7. A device for controlling a variable condition, said device comprising a radiant energy electric generator, a source of ionizing energy, said radiant energy electric generator being disposed relative to said source of ionizing energy so that the variable condition is effective to attenuate the amount of ionizing energy impinging upon said cell, a sampling capacitor in circuit connection with the generator, means for periodically discharging the sampling capacitor whereby a pulse of current is formed, means for periodically short circuiting said generator, said generator being short circuited and said capacitor being discharged at time intervals less than the interval required for the generator to reach a potential equal to eight-tenths of its open circuit potential, means for amplifying said current pulse, means for producing a reference signal of predetermined magnitude, means for comparing said amplified pulse with said reference signal, and a trigger circuit responsive to said comparison.

8. A control device comprising a radiant energy electric generator, a source of ionizing energy, said radiant energy electric generator being disposed relative to said ionizing energy so that the variable condition is effective to attenuate the amount of ionizing energy impinging upon said generator, a sampling capacitor in circuit connection with the generator, cyclically operable switch means for periodically discharging the sampling capacitor whereby a pulse of current is formed, means for amplifying the current pulse, means for producing a reference signal of predetermined magnitude, means for comparing said amplified pulse with said reference signal, a trigger circuit responsive to said comparison, said trigger circuit being effective to energize apparatus for affecting said variable condition, means for maintaining said apparatus in an energized condition for a period of time equal to the cyclic time of said switch means.

9. A device for controlling a variable condition, said device comprising a radiant energy electric generator, a source of ionizing energy, said radiant energy electric generator being disposed relative to said source of ionizing energy so that the variable condition is effective to attenuate the amount of ionizing energy impinging upon said generator; a sampling capacitor in circuit connection with the generator, cyclically operative switch means for periodically discharging the sampling condenser and simultaneously short circuiting the generator whereby a pulse of current is formed, said switch means being effective to maintain said generator in a short circuited condition for a period equal to substantially one fourth of the cyclic time of switch operation, means for amplifying said current pulse, means for producing a reference signal of predetermined amplitude, and means for comparing said amplified pulse with said reference signal, and a trigger circuit responsive to said comparison.

10. A device for controlling a variable condition, said device comprising a radiant energy electric generator, a source of ionizing energy, said radiant energy electric generator being disposed relative to said source of ionizing energy so that the variable condition is effective to attenuate the amount of ionizing energy impinging upon said generator, said ionizing energy being effective to produce a plasma of ions within said generator, a sampling capacitor in circuit connection with the generator, cyclically operative switch means for periodically discharging the sampling condenser and simultaneously short circuiting the generator whereby a pulse of current is formed, said switch means being effective to maintain said generator in a short circuited condition for a period sufficient to permit any residual ions formed within said generator to be neutralized, means for amplifying said current pulse, means for producing a reference signal of predetermined amplitude, and means for comparing said amplified pulse with said reference signal, and a trigger circuit responsive to said comparison.

11. A device for controlling a variable condition, said device comprising a radiant energy electric generator, a source of ionizing energy, said radiant energy electric generator being disposed relative to said source of ionizing energy so that the variable condition is effective to attenuate the amount of ionizing energy impinging upon said generator, a sampling capacitor in circuit connection with the generator, means for periodically discharging the sampling condenser whereby a pulse of current is formed, means for periodically short circuiting said generator, said generator being short circuited, and said capacitor being discharged at time intervals less than the interval required for the generator to reach its critical potential whereby said generator is always operated so as to be most sensitive to changes in the amount of ionizing energy impinging therein, means for amplifying said current pulse, means for producing a reference signal of predetermined amplitude, and means for comparing said amplified pulse with said reference signal, and a trigger circuit responsive to said comparison.

12. A control device comprising a radiant energy electric generator, a source of ionizing energy, a sampling capacitor in circuit connection with the radiant energy electric generator, means for periodically short circuiting the sampling capacitor whereby a pulse of current is produced, an amplifier for amplifying said current pulse, a trigger circuit including a unistable multi-vibrator having a first control grid in circuit connection with the output of said amplifier, means for applying a predetermined bias to said first control grip, said multi-vibrator being driven to its unstable condition when the output of said amplifier exceeds said control bias, said trigger circuit being effective to energive apparatus for affecting said variable conditions when said multi-vibrator is driven to its unstable condition.

13. A control device comprising a radiant energy electric generator, a sampling capacitor in circuit connection with the radiant energy electric generator, cyclically operated switch means for periodically discharging the sampling capacitor whereby a pulse of current is produced, an amplifier for amplifying said current pulse, a trigger circuit including a unistable multi-vibrator having a first control grid in circuit connection with the output of said amplifier, means for applying a predetermined bias to said first control grid, said multivibrator being driven to its unstable condition when the output of said amplifier exceeds said control bias, said trigger circuit being effective to energize apparatus for affecting said variable condition when said multi-vibrator is driven to its unstable condition, and means for maintaining said apparatus in the energized condition for a period equal to the cyclic time of said switch means.

14. A device for controlling the value of a variable condition, said device comprising a condition sensing element effective to vary an electrical current flow in accordance with the value of the variable condition, a sampling capacitor in circuit connection with the condition sensing element, cyclically operable switch means for periodically discharging the sampling capacitor whereby a pulse of current is produced, an amplifier for amplifying said current pulse, a trigger circuit including a unistable multi-vibrator having a first control grid in circuit connection with the output of said amplifier, means for applying a bias to said first control grid, the magnitude of said bias being equal to the signal applied to said control grid from the amplifier corresponding to a predetermined value of said variable condition, said multi-vibrator being driven to its unstable condition when the output of said amplifier exceeds said control bias, said trigger circuit being effective to energize apparatus for affecting said variable condition in one manner when said multi-vibrator is driven to its unstable condition, and being effective to energize apparatus for affecting said variable condition in a different manner when said multi-vibrator remains in its stable condition.

15. A device for controlling the value of a variable condition, a radiant energy electric generator, a source of ionizing energy, a sampling capacitor in circuit connection with the radiant energy electric generator, cyclically operable switch means for periodically discharging the sampling capacitor whereby a pulse of current is produced, an amplifier for amplifying said current pulse, a trigger circuit including a unistable multi-vibrator having a first control grid in circuit connection with the output of said amplifier, means for applying a bias to said first control grid, the magnitude of said bias being equal to the signal applied to said control grid from the amplifier corresponding to a predetermined value of said variable condition, said multi-vibrator being driven to its unstable condition when the output of said amplifier exceeds said control bias, said trigger circuit being effective to energize apparatus for affecting said variable condition in one manner when said multi-vibrator is driven to its unstable condition, and being effective to energize apparatus for affecting said variable condition in a different manner when said multi-vibrator remains in its stable condition.

16. A device for controlling the value of a variable condition, a radiant energy electric generator, a source of ionizing energy, a sampling capacitor in circuit connection with the radiant energy electric generator, cyclically operable switch means for periodically discharging the sampling capacitor whereby a pulse of current is produced, an amplifier for amplifying said current pulse, a trigger circuit including a unistable multi-vibrator having a first control grid in circuit connection with the output of said amplifier, means for applying a bias to said first control grid, the magnitude of said bias being equal to the signal applied to said control grid from the amplifier corresponding to a predetermined value of said variable condition, said multi-vibrator being driven to its unstable condition when the output of said amplifier exceeds said control bias, said trigger circuit being effective to energize apparatus for affecting said variable condition in one manner when said multi-vibrator is driven to its unstable condition, and being effective to energize apparatus for affecting said variable condition in a different manner when said multi-vibrator remains in its stable condition, and means for maintaining said apparatus in an energized state for a period equal to the cyclic time of said switch means.

17. A control device comprising a condition sensing element effective to vary an electrical current flow in accordance with the value of a variable condition, a sampling capacitor in circuit connection with the condition sensing element, cyclically operative switch means for periodically discharging the sampling capacitor whereby a pulse of current is produced, an amplifier for amplifying said current pulse, a trigger circuit including a unistable multi-vibrator having a first control grid in circuit connection with the output of said amplifier, means for applying a predetermined bias to said first control grid, said multi-vibrator being driven to its unstable condition when the output of said amplifier exceeds said control bias, apparatus for affecting said variable condition, a relay effective to energize said apparatus when said relay is closed, said trigger circuit being effective to close said relay when said multi-vibrator is driven to its unstable condition, said trigger circuit also being effective to energize a capacitor in circuit connection with said relay, said capacitor being effective to maintain said relay in an energized condition for a period of time equal to the cyclic time of said switch means.

18. A control device comprising a radiant energy electric generator, a source of ionizing energy, a sampling capacitor in circuit connection with the radiant energy electric generator, cyclically operative switch means for periodically discharging the sampling capacitor whereby a pulse of current is produced, an amplifier for amplifying said current pulse, a trigger circuit including a unistable multivibrator having a first control grid in circuit connection with the output of said amplifier, means for applying a predetermined bias to said first control grid, said multivibrator being driven to its unstable condition when the output of said amplifier exceeds said control bias, apparatus for affecting said variable condition, a relay effective to energize said apparatus when said relay is closed, said trigger circuit being effective to close said relay when said multivibrator is driven to its unstable condition, said trigger circuit also being effective to energize a capacitor in circuit connecton with said relay, said capacitor being effective to maintain said relay in an energized condition for a period of time equal to the cyclic time of said switch means.

19. A control device for energizing apparatus in accordance with whether a variable condition is below a lower predetermined value, intermediate the lower predetermined value and an upper predetermined value, or above said upper predetermined value, said control device comprising a condition sensing element effective to vary an electrical current flow in accordance with the value of a variable condition, a sampling capacitor in circuit connection with the condition sensing element, means for periodically discharging the sampling capacitor whereby a pulse of current is produced, means for amplifying said current pulse, means for producing a first reference signal of a magnitude corresponding to the amplifier output when the variable condition corresponds to the lower predetermined level, means for comparing said amplified pulse with said first reference signal, and a first trigger circuit responsive to said comparison, means for producing a second reference signal of a magnitude corresponding to the amplifier output when the variable condition corresponds to the upper predetermined value, means for comparing said amplified pulse with said second reference signal, and a second trigger circuit responsive to said comparison.

20. An indicating device comprising a radiant energy electric generator, a source of ionizing energy, a sampling capacitor in circuit connection with the radiant energy electric generator, means for periodically short circuiting the sampling capacitor whereby a pulse of current is produced, an amplifier for amplifying said current pulse, a multivibrator having a first control grid in circuit connection with the output of said amplifier, means for applying a bias to said first control grid, said means including a calibrated potentiometer, an electric bulb connected to the multi-vibrator, and being adapted for energization when said amplified pulse exceeds said bias.

21. A control device for energizing apparatus in accordance with whether a variable condition is below a lower predetermined value, intermediate the lower predetermined value and an upper predetermined value, or above said upper predetermined value, said control device comprising a radiant energy electric generator, a source of ionizing energy, a sampling capacitor in circuit connection with the radiant energy electric generator, means for periodically discharging the sampling capacitor whereby a pulse of current is produced, means for amplifying said current pulse, means for producing a first reference signal of a magnitude corresponding to the amplifier output when the variable condition corresponds to the lower predetermined level, means for comparing said amplified pulse with said first reference signal, and a first trigger circuit responsive to said comparison, means for producing a second reference signal of a magnitude corresponding to the amplifier output when the variable condition corresponds to the upper predetermined value, means for comparing said amplified pulse with said second reference signal, and a second trigger circuit responsive to said comparison.

References Cited in the file of this patent
UNITED STATES PATENTS

| | | |
|---|---|---|
| 2,571,439 | Glass | Oct. 16, 1951 |
| 2,648,015 | Greenfield et al. | Aug. 4, 1953 |
| 2,695,363 | Marvin | Nov. 23, 1954 |